(12) United States Patent
Kishimoto et al.

(10) Patent No.: US 10,576,412 B2
(45) Date of Patent: Mar. 3, 2020

(54) GAS TREATMENT METHOD AND GAS TREATMENT DEVICE

(71) Applicants: Kobe Steel, Ltd., Hyogo (JP);
NATIONAL UNIVERSITY CORPORATION NAGOYA UNIVERSITY, Aichi (JP)

(72) Inventors: Akira Kishimoto, Kobe (JP); Akira Matsuoka, Kobe (JP); Katsuya Akiyama, Kobe (JP); Makoto Nishimura, Kobe (JP); Hiroshi Machida, Aichi (JP); Tsuyoshi Yamaguchi, Aichi (JP); Takehiro Esaki, Aichi (JP); Hirotoshi Horizoe, Aichi (JP)

(73) Assignees: Kobe Steel, Ltd., Hyogo (JP);
NATIONAL UNIVERSITY CORPORATION NAGOYA UNIVERSITY, Aichi (JP)

( * ) Notice: Subject to any disclaimer, the term of this patent is extended or adjusted under 35 U.S.C. 154(b) by 21 days.

(21) Appl. No.: 15/965,464

(22) Filed: Apr. 27, 2018

(65) Prior Publication Data
US 2018/0311610 A1    Nov. 1, 2018

(30) Foreign Application Priority Data
May 1, 2017    (JP) .................................. 2017-091045

(51) Int. Cl.
*B01D 53/14*    (2006.01)
*B01D 53/18*    (2006.01)

(52) U.S. Cl.
CPC ..... *B01D 53/1425* (2013.01); *B01D 53/1468* (2013.01); *B01D 53/1475* (2013.01);
(Continued)

(58) Field of Classification Search
None
See application file for complete search history.

(56) References Cited

U.S. PATENT DOCUMENTS

2018/0193798 A1\*    7/2018    Kishimoto ............. B01D 53/62

FOREIGN PATENT DOCUMENTS

JP        2011-213494 A      10/2011
WO    WO-2017033821 A1 \*    3/2017  ............. B01D 53/62

OTHER PUBLICATIONS

Takashi Tomikawa et al.; "Search and Study of Carbon Dioxide Absorbent Separating into Two Liquid Phases"; Society for Chemical Engineers Japan 46th Aufumn Meeting; 2014; Fukuoka, Japan.
(Continued)

*Primary Examiner* — Daniel Berns
(74) *Attorney, Agent, or Firm* — Studebaker & Brackett PC

(57) ABSTRACT

A gas treatment device uses a gas to be treated which contains an acid compound that dissolves into water to produce acid and a treatment liquid which absorbs the acid compound to phase-separate, to separate an acid compound from the gas to be treated. The gas treatment device includes an absorber which brings the gas to be treated into contact with the treatment liquid; a regenerator 14 which heats the treatment liquid contacting the gas to be treated to separate an acid compound; and a liquid feeding portion which feeds the treatment liquid contacting the gas to be treated in the absorber to the regenerator. In the absorber, the treatment liquid contacting the gas to be treated phase-separates into a first phase portion having a high acid compound content and a second phase portion having a low acid compound content. The liquid feeding portion is configured to introduce, into the regenerator, the treatment liquid with the phase-separated first phase portion and second phase portion mixed.

7 Claims, 11 Drawing Sheets

(52) U.S. Cl.
CPC .... B01D 53/1481 (2013.01); *B01D 2252/202* (2013.01); *B01D 2252/2025* (2013.01); *B01D 2252/20415* (2013.01); *B01D 2252/20421* (2013.01); *B01D 2252/20426* (2013.01); *B01D 2252/20431* (2013.01); *B01D 2252/20484* (2013.01); *B01D 2252/20489* (2013.01); *B01D 2252/504* (2013.01); *B01D 2257/2045* (2013.01); *B01D 2257/30* (2013.01); *B01D 2257/302* (2013.01); *B01D 2257/504* (2013.01); *B01D 2259/40088* (2013.01)

(56) References Cited

OTHER PUBLICATIONS

Ludovic Raynal et al.; "The DMX™ Process: An Original Solution for Lowering the Cost of Post-Combustion Carbon Capture"; Energy Procedia 4, 2011; pp. 779-786.

* cited by examiner

GAS TREATMENT METHOD AND GAS TREATMENT DEVICE

TECHNICAL FIELD

The present invention relates to a gas treatment method and a gas treatment device.

BACKGROUND ART

A conventionally known gas treatment method separates an acid compound by bringing a gas to be treated which contains an acid compound into contact with a treatment liquid. As a gas treatment method of this kind, for example, as disclosed in Literature 1 (Takashi Tomikawa, other two persons, "Search and Study of Carbon Dioxide Absorbent Separating into Two Liquid Phases", Society for Chemical Engineers, Japan, Annual Meeting, Fukuoka, 2014) and Literature 2 (Raynal, L., et al., The DMXTM process: an original solution for lowering the cost of post-combustion carbon capture, Energy Procedia, 4, 779-786, 2011), a method using a treatment liquid (absorbent) which liquid-phase-separates into a first phase portion having a high acid compound content and a second phase portion having a low acid compound content is well known.

The gas treatment device which executes the method disclosed in Literature 1 includes an absorber 71, a liquid separator 72, a heat exchanger 73, and a regenerator 74 as shown in FIG. 10. In the absorber 71, exhaust gas (gas to be treated) containing carbon dioxide, and an absorbent consisting of MEA (monoethanolamine), additive, and water come into contact with each other. The absorbent liquid-phase-separates into a first phase portion ($CO_2$ rich phase) having a high carbon dioxide content and a second phase portion ($CO_2$ lean phase) having a low $CO_2$ content. In this state, the absorbent is sent to the liquid separator 72. The absorbent stored in the liquid separator 72 has a lower region in which the first phase portion is present and an upper region in which the second phase portion is present. The lower region absorbent is sent to the regenerator 74 because of a high carbon dioxide content. At this time, the absorbent is preheated in the heat exchanger 73. On the other hand, the upper region absorbent is returned to the absorber 71 because of a low carbon dioxide content. The absorbent separates carbon dioxide therefrom by heating in the regenerator 74. The carbon dioxide separated from the absorbent is collected through a collection path, while the absorbent having released carbon dioxide is returned to the absorber 71 via the heat exchanger 73. Literature 1 shows that a unit of energy when 2-(Methylamino)ethanol (MAE) is used as an amine compound is 2.7 GJ/t-$CO_2$.

The gas treatment device disclosed in Literature 2, as shown in FIG. 11, has the same configuration as that of the device shown in FIG. 10, except that a liquid separator 72 is positioned between a heat exchanger 73 and a regenerator 74.

As a device which implements the above gas treatment method, such a configuration as disclosed in Literature 3 (Japanese Unexamined Patent Publication No. 2011-213494) is known which is provided with a heat pump but does not use a treatment liquid (absorbent) which liquid-phase-separates into a first phase portion and a second phase portion. Use of a heat pump enables use of heat generated by heating reaction in an absorber as a heat source of heat absorbing reaction in a regenerator. Accordingly, a heat input from the outside can be suppressed.

In the gas treatment methods disclosed in Literatures 1 and 2, while an absorbent containing the first phase portion having a high carbon dioxide content is sent to a regenerator, an absorbent containing the second phase portion having a low carbon dioxide is returned to the absorber. This is based on a technical idea that removing the second phase portion having a low carbon dioxide to reduce a ratio of water in a treatment liquid introduced into the regenerator enables reduction in energy necessary for heating a treatment liquid in the regenerator. On the other hand, it is demanded to further reduce energy necessary for separately collecting an acid compound.

SUMMARY OF INVENTION

An object of the present invention is to further reduce energy necessary for separately collecting an acid compound in a method using a treatment liquid that phase-separates into a first phase portion having a high acid compound content and a second phase portion having a low acid compound content to separate an acid compound and a device therefor.

The inventors of the present invention have conducted intensive studies to achieve the above-described purpose. In a conventional method, a second phase portion having a low acid compound content is not introduced into a regenerator but is returned to an absorber. However, as a result of various studies, the inventors of the present invention found that, instead of removing the second phase portion having a low acid compound content, energy necessary for separating an acid compound could be further reduced by introducing the second phase portion into the regenerator together with the first phase portion, and have conceived the present invention.

A gas treatment method according to one aspect of the present invention includes an absorption step of bringing into contact with each other in an absorber, a gas to be treated which contains an acid compound that dissolves into water to produce acid and a treatment liquid which absorbs the acid compound to phase-separate, to cause the acid compound contained in the gas to be treated to be absorbed in the treatment liquid; a liquid feeding step of feeding the treatment liquid, in which the acid compound contained in the gas to be treated is absorbed, from the absorber to a regenerator; and a reproduction step of heating the treatment liquid in the regenerator to separate an acid compound from the treatment liquid. In the absorption step, the treatment liquid contacting the acid compound in the gas to be treated phase-separates into a first phase portion having a high acid compound content and a second phase portion having a low acid compound content, and in the liquid feeding step, the treatment liquid having the phase-separated first phase portion and second phase portion mixed is introduced into the regenerator.

A gas treatment device according to another aspect of the present invention uses a gas to be treated which contains an acid compound that dissolves into water to produce acid and a treatment liquid which absorbs the acid compound to phase-separate, to separate an acid compound from the gas to be treated. The gas treatment device includes an absorber which brings the gas to be treated into contact with the treatment liquid; a regenerator which heats the treatment liquid contacting the gas to be treated to separate an acid compound; and a liquid feeding portion which feeds the treatment liquid contacting the gas to be treated in the absorber to the regenerator. In the absorber, the treatment liquid contacting the gas to be treated phase-separates into a first phase portion having a high acid compound content and a second phase portion having a low acid compound content. The liquid feeding portion is configured to introduce, into the regenerator, the treatment liquid with the phase-separated first phase portion and second phase portion mixed.

DESCRIPTION OF EMBODIMENTS

In the following, modes for implementing the present invention will be described in detail with reference to the drawings.

First Embodiment

A gas treatment device 10 according to a first embodiment is a gas treatment device using a treatment liquid that conducts phase separation by absorption of an acid compound which produces acid as a result of dissolution in water, thereby separating an acid compound from a gas to be treated which contains the acid compound.

Figure 1:
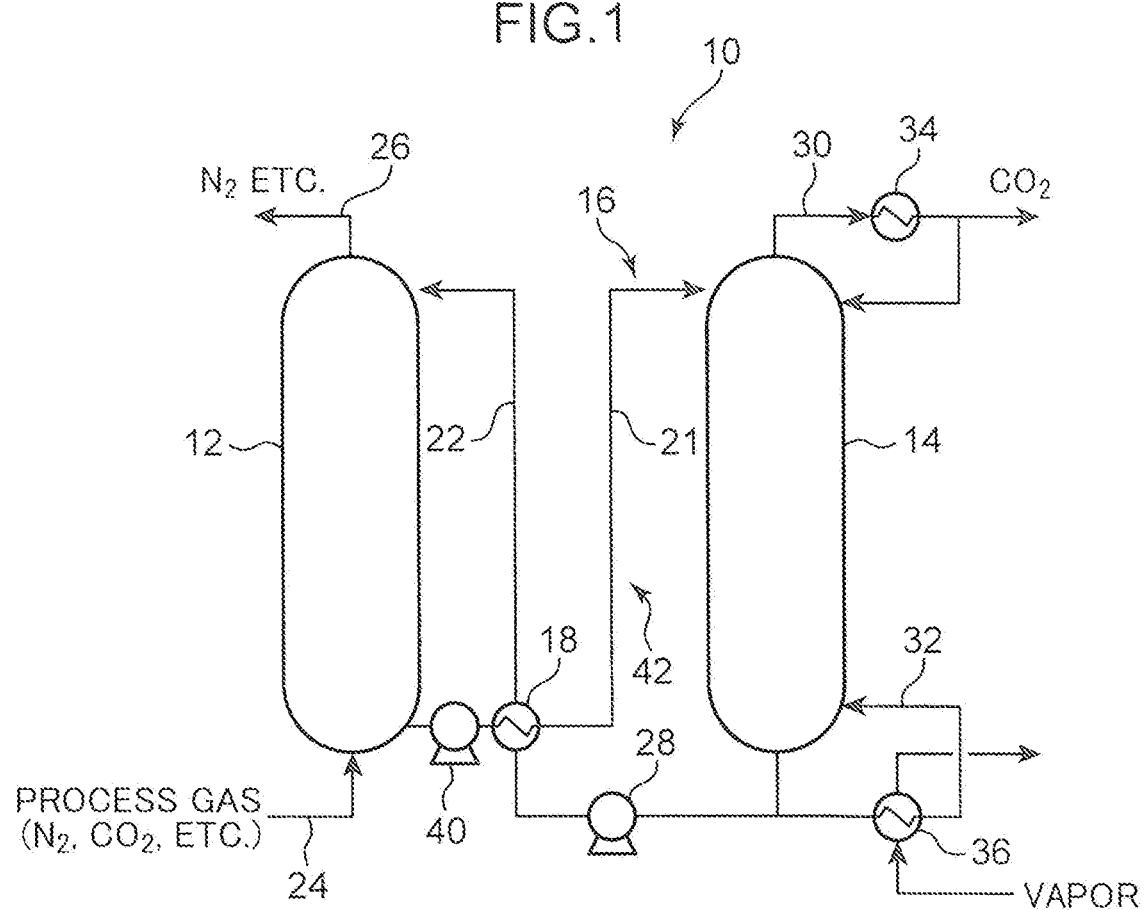
FIG. 1 is a diagram schematically showing an entire configuration of a gas treatment device according to a first embodiment.

As shown in FIG. 1, the gas treatment device 10 includes an absorber 12, a regenerator 14, a circulation path 16, and a heat exchanger 18. The circulation path 16 includes a first flow path 21 for extracting a treatment liquid from the absorber 12 to introduce the same into the regenerator 14, and a second flow path 22 for extracting a treatment liquid from the regenerator 14 so as to be refluxed to the absorber 12. The heat exchanger 18 can be omitted.

Connected to the absorber 12 are a gas supply path 24 which supplies a gas to be treated such as a process gas or the like, a gas discharge path 26 which discharges the treated gas, the first flow path 21 for sending a treatment liquid to the regenerator 14, and the second flow path 22 for returning a treatment liquid from the regenerator 14 to the absorber 12. The gas supply path 24 is connected to a lower end portion of the absorber 12, and the gas discharge path 26 is connected to an upper end portion of the absorber 12. The first flow path 21 is connected to the lower end portion of the absorber 12 or to the vicinity of the lower end portion. In other words, the first flow path 21 is connected to such a position of the absorber 12 where a treatment liquid pooled in the absorber 12 can be extracted. The second flow path 22 is connected to the upper end portion of the absorber 12 or to the vicinity of the upper end portion. In other words, the second flow path 22 is connected to such a position of the absorber 12 where a treatment liquid refluxed from the regenerator 14 is caused to flow down from upward.

In the absorber 12, a gas to be treated and a treatment liquid come into contact with each other, so that an acid compound in the gas to be treated is absorbed into the treatment liquid, and gas with an acid compound removed is discharged from the absorber 12. Such absorber 12 only needs to be configured to enable a gas to be treated and a treatment liquid to continuously come into contact with each other. Applicable configurations of an absorber include, for example, a configuration in which a treatment liquid is sprayed to a flow path of a gas to be treated, a configuration in which a treatment liquid is caused to flow down along a filler arranged in a flow path of a gas to be treated, and a configuration in which a gas to be treated and a treatment liquid are respectively introduced into numerous fine flow paths so that fine flow paths for the gas to be treated and fine flow paths for the treatment liquid are combined. Absorption of an acid compound in the absorber 12 is exothermic reaction. When the acid compound is carbon dioxide, an exothermic value per 1 t of carbon dioxide absorption is about 1.8 GJ. The heat of reaction generated in the absorber 12 increases a temperature of the gas to be treated and the treatment liquid.

The first flow path 21 and the second flow path 22 are connected to the regenerator 14. The first flow path 21 is connected to an upper part of the regenerator 14 to introduce, into the regenerator 14, a treatment liquid derived from the absorber 12. The second flow path 22 is connected to a lower end portion of the regenerator 14 or to the vicinity of the lower end portion to derive a treatment liquid stored in the regenerator 14. The second flow path 22 is provided with a pump 28.

A treatment liquid is stored in the regenerator 14. In the regenerator 14, as a result of heating of the stored treatment liquid, an acid compound is released. The release of an acid compound from the treatment liquid is endothermic reaction. In the regenerator 14, when the treatment liquid is heated, not only the acid compound is released but also water in the treatment liquid evaporates.

A supply path 30 and a heating flow path 32 are connected to the regenerator 14. The supply path 30 supplies an acid compound obtained in the regenerator 14 to a supply destination. The supply path 30 is provided with a condenser 34 which cools a mixed gas of a gas of an acid compound evaporated from a treatment liquid and water vapor. Since when the mixed gas is cooled, water vapor condenses, water vapor can be separated. The separated water vapor is refluxed to the regenerator 14. Usable as the condenser 34 is a heat exchanger which uses low-cost cooling water such as river water or the like.

Although the heating flow path 32 has one end portion connected to the second flow path 22, the one end portion of the heating flow path 32 may be connected to the lower end portion of the regenerator 14 or to the vicinity of the lower end portion. The other end portion of the heating flow path 32 is connected to a lower part of the regenerator 14. The heating flow path 32 is provided with a reboiler 36 which heats a treatment liquid stored in the regenerator 14. The reboiler 36 may be disposed to heat a treatment liquid in the regenerator 14. Additionally, the reboiler 36 may be configured so as to heat a treatment liquid externally extracted from the regenerator 14 as shown in the figure. In this case, the reboiler 36 can be disposed in the heating flow path 32 for refluxing the treatment liquid to the regenerator 14 after heating. Usable as the reboiler 36 is a boiler which directly or indirectly heats a treatment liquid by an arbitrary heat source such as, for example, electricity, vapor, a burner or the like.

The heat exchanger 18 is connected to the first flow path 21 and the second flow path 22. In the heat exchanger 18, heat exchange is conducted between a treatment liquid flowing through the first flow path 21 and a treatment liquid flowing through the second flow path 22. The heat exchanger 18, which is configured with, for example, a plate heat exchanger or the like, can be configured with a microchannel heat exchanger capable of heat exchange between fluids between which a temperature difference is relatively small. In this case, energy efficiency can be further increased.

An acid compound separated by the gas treatment device 10 is not particularly limited, but can be any acid compound whose aqueous solution becomes acid. Among examples of the acid compound are hydrogen chloride, carbon dioxide, sulfur dioxide, and carbon disulfide.

A treatment liquid (absorbent) for use in the gas treatment device 10 is an absorbent capable of reversibly absorbing and releasing an acid compound. A treatment liquid is, for example, an alkaline absorbent containing water, an amine compound, and an organic solvent. It is desirable that a content of the amine compound is 30 wt %, that of the organic solvent is 60 wt %, and that of water is 10 wt %.

Examples of the amine compound include primary amine, secondary amine, tertiary amine, and the like. Examples of the primary amine include, for example, 1,3-diaminopropane (DAP: solubility parameter=14.6 $(cal/cm^3)^{1/2}$), 2-aminoethanol (MEA: solubility parameter=14.3 $(cal/cm3)^{1/2}$), DL-2-amino-1-propanol (AP: solubility parameter=13.3 $(cal/cm^3)^{1/2}$), 2-(2-aminoethoxy)ethanol (AEE: solubility parameter=12.7 $(cal/cm^3)^{1/2}$), (R)-4-amino-2-methyl-1-butanol (AMB), and the like. Examples of the secondary amine include, for example, 2-(methylamino)ethanol (MAE), 2-(ethylamino)ethanol (EAE), 2-(butylamino)ethanol (BAE), and the like. Examples of the tertiary amine include, for example, triethanolamine (TEA), N-methyldiethanolamine (MDEA), tetramethylethylenediamine (TEMED), pentamethyldiethylenetriamine (PMDETA), hexamethyltriethylenetetramine, bis(2-dimethylaminoethyl)ether, and the like.

Examples of the organic solvent include, for example, 1-butanol (solubility parameter=11.3 $(cal/cm^3)^{1/2}$), 1-pentanol (solubility parameter=11.0 $(cal/cm^3)^{1/2}$), octanol, diethylene glycol diethyl ether (DEGDEE), diethylene glycol dimethyl ether (DEGDME), and the like. A plurality of these kinds may be combined for use.

Each solubility parameter of the amine compound and the organic solvent preferably falls within a predetermined range. The solubility parameter is represented by the following Equation (1).

[Formula 1]

$$\delta = \sqrt{(\Delta H - RT)/V} \quad (1)$$

ΔH represents molar latent heat of evaporation, R represents gas constant, T represents absolute temperature, and V represents molar volume. Calculating solubility parameters of EAE and MAE which are amine compounds and DEGDME which is an organic solvent from Equation (1) results in having 10.94, 11.58, and 7.75, respectively.

TABLE 1

| Solubility parameter difference/two-phase separation performance | | | Organic solvent/solubility parameter [$(cal/cm^3)^{1/2}$] | | |
|---|---|---|---|---|---|
| | | | 1-butanol 11.3 | 1-pentanol 11.0 | DEGDEE 8.2 |
| Amine compound/ solubility parameter [$(cal/cm^3)^{1/2}$] | DAP | 14.6 | 3.3 Good | 3.6 Good | 6.5 Not mixed |
| | MEA | 14.3 | 3.0 Good | 3.3 Good | 6.1 Not mixed |
| | AP | 13.3 | 2.0 Good | 2.3 Good | 5.1 Not mixed |
| | AEE | 12.7 | 1.4 Good | 1.7 Good | 4.5 Not mixed |
| | MAE | 12.5 | 1.2 Good | 1.5 Good | 4.4 Not mixed |
| | EAE | 12.0 | 0.7 Not separated | 1.0 Not separated | 3.8 Good |
| | AMB | 8.8 | −2.5 Not separated | −2.2 Not separated | 0.6 Not separated |

As shown in Table 1, amine compounds and organic solvents may be selectively combined such that in an absorbent containing water, an amine compound, and an organic solvent, a value obtained by subtracting a solubility parameter of an organic solvent from a solubility parameter of an amine compound is not less than 1.1 $(cal/cm^3)^{1/2}$ and not more than 4.2 $(cal/cm^3)^{1/2}$. In this case, absorption of an acid compound causes two-phase separation, a phase having a high acid compound content and a phase having a low acid compound content. When the solubility parameter fails to reach the above-mentioned lower limit value, even when the treatment liquid absorbs an acid compound, two-phase separation might not occur. On the other hand, when the solubility parameter exceeds the above-mentioned upper limit value, two-phase separation might occur before the treatment liquid absorbs an acid compound. In this case, in a step of bringing the treatment liquid into contact with the gas to be treated which contain an acid compound, a state of contact between the treatment liquid and the gas to be treated becomes uneven, so that absorption efficiency might be reduced. "Good" in Table 1 means that a single liquid phase before absorption of carbon dioxide was separated into two liquid phases due to absorption of carbon dioxide. Additionally, "not mixed" in Table 1 means that a two-liquid phase was brought about before absorption of carbon dioxide and no single-liquid phase was formed. Additionally, "not separated" in Table 1 means that a single liquid phase remained even after absorption of carbon dioxide.

In the gas treatment device 10 according to the present embodiment, while a treatment liquid which separates into two phases is used in the absorber 12, a mixing portion 40 is provided which mixes the phase-separated two phases before being introduced into the regenerator 14. In the first embodiment, the first flow path 21 and the mixing portion 40 configure a liquid feeding portion 42 which introduces, into the regenerator 14, a treatment liquid with phase-separated first phase portion and second phase portion mixed.

The mixing portion 40 is provided in the first flow path 21 and mixes a treatment liquid in the middle of sending of the treatment liquid from the absorber 12 to the regenerator 14. The mixing portion 40 in FIG. 1, which is arranged upstream of the heat exchanger 18 in the first flow path 21, may be arranged downstream of the heat exchanger 18 in the first flow path 21.

In the first embodiment, the mixing portion 40 is configured with a pump. Adoptable as a pump are, for example, a pump having a blade-shaped rotor (a centrifugal pump, an axial flow pump, etc.), a gear pump, a screw pump, a reciprocating pump, and the like. The treatment liquid is mixed in the pump and discharged from the pump.

Figure 2:
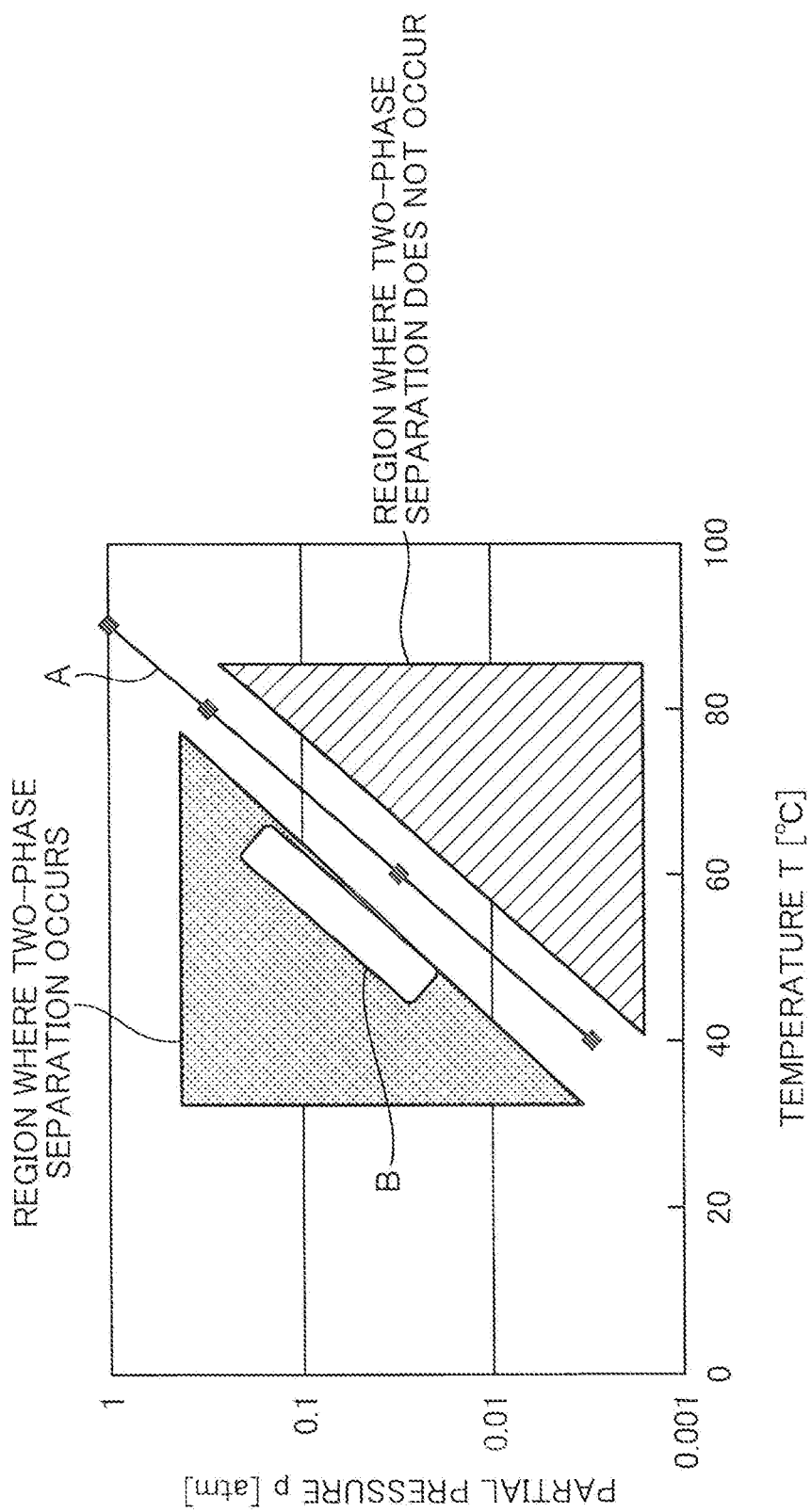
FIG. 2 is a diagram for explaining a condition for a treatment liquid to conduct phase separation.

Here, description will be made of a reason for mixing the treatment liquid (an absorbing solution) to be sent to the regenerator 14. FIG. 2 is illustrated for explaining an absorption condition and a reproduction condition for a treatment liquid. FIG. 2 shows a boundary (solid line A in the figure) between a region in which a treatment liquid phase-separates and a region in which the treatment liquid does not phase-separate. The abscissa in the figure represents a temperature T and the ordinate represents a partial pressure p of an acid compound at atmospheric pressure. FIG. 2 shows a phase separation boundary in a case of a treatment liquid using EAE as an amine compound and DEGDEE as an organic solvent. Additionally, FIG. 3 shows a phase separation boundary in not only a case of a treatment liquid using EAE as an amine compound and DEGDEE as an organic solvent but also a case of a treatment liquid using MAE as an amine compound, and a case of a treatment liquid using DEGDME as an organic solvent.

With respect to the solid line A in FIG. 2, an upper left side region is a region where a treatment liquid separates into two phases due to absorption of carbon dioxide and a lower right region is a region where a treatment liquid does not separate into two phases without absorption of carbon dioxide. As shown in FIG. 2, with the phase-separation boundary provided therebetween, there exist a region where a treatment liquid phase-separates to absorb much carbon dioxide and a region where a treatment liquid does not phase-separate and not much carbon dioxide is dissolved. Then, it is preferable to operate the absorber 12 under a condition for entering a region B along a boundary line A in the region of two-phase separation.

Figure 3:
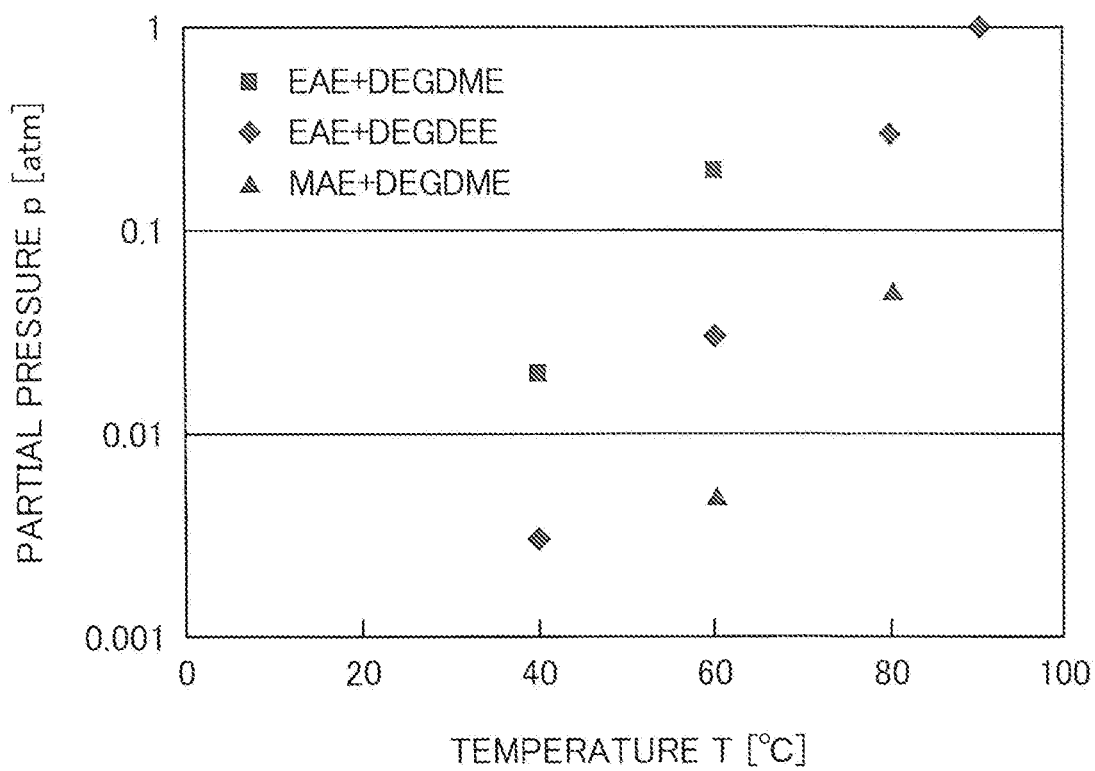
FIG. 3 is a diagram for explaining a condition for a treatment liquid to conduct phase separation.

FIG. 2 and FIG. 3 show results obtained by observing phase separation of a treatment liquid when a gas of a mixture of carbon dioxide and nitrogen was circulated in the treatment liquid. Test was conducted with a treatment liquid having a temperature in a range of 20° C. to 90° C. at a partial pressure of carbon dioxide of 0.01 to 1 atmospheric pressure.

In the test regarding a combination of EAE and DEGDEE, under absorption conditions that the temperature was 40° C. and the partial pressure of carbon dioxide was 0.2 atmospheric pressure, the treatment liquid was separated into a carbon dioxide concentrated phase and a carbon dioxide rarefied phase. The carbon dioxide absorption at this time showed 0.44 mol-$CO_2$/mol-amine On the other hand, under the conditions that the temperature was 90° C. and the partial pressure of carbon dioxide was 1 atmospheric pressure, the treatment liquid had no phase separation. The carbon dioxide absorption at this time was 0.12 mol-$CO_2$/mol-amine.

A condition for absorption in the absorber 12 is set to be in a region where the treatment liquid separates into two phases while having much carbon dioxide dissolved and a condition for reproduction in the regenerator 14 is set to be in a region where the treatment liquid fails to conduct two-phase separation and little carbon dioxide is dissolved. This suppresses a temperature difference between a reproduction temperature and an absorption temperature to be small. In other words, it is made use of unbalance of a carbon dioxide absorption concentration caused by variation of liability of phase separation with a change of absorption of carbon dioxide depending on a temperature. This makes it possible to suppress a temperature difference between a reproduction temperature and an absorption temperature to be small.

Conditions of operation temperature for each treatment liquid are shown in Table 2. In Table 2, "mixed" in a column of a reproduction temperature represents that a phase-separated treatment liquid is introduced into the regenerator 14 as in the present embodiment, and "non-mixed" represents that a second phase portion having a low carbon dioxide content is returned to the absorber 12 as in the conventional art, while only a first phase portion having a high carbon dioxide content is introduced into the regenerator 14.

TABLE 2

| Treatment liquid | Absorption temperature [° C.] | Reproduction temperature [° C.] Mixed | Non-mixed |
|---|---|---|---|
| EAE + DEGDEE | 50 | 90 | 120 |
| EAE + DEGDME | 30 | 70 | 120 |
| MAE + DEGDEE | 70 | 110 | 120 |

Regarding EAE+DEGDEE, in a case of "non-mixed", an absorption temperature is 50° C. and a reproduction temperature is 120° C., so that a temperature difference is 70° C. By contrast, in a case of "mixed", an absorption temperature is 50° C. and a reproduction temperature is 90° C., so that a temperature difference is 40° C. Accordingly, it can be found that in a case of "mixed", the temperature difference is half that of a conventional case. Thus, while in the absorber 12, the treatment liquid phase-separates, the absorbing solution introduced into the regenerator 14 has the phase-separated two phases mixed, so that a unit of energy can be reduced. A unit of energy in a case of "mixed" will be, for example, 1.43 GJ/t-$CO_2$.

The treatment liquid is thus two-phase-separated by absorption of an acid compound with ease. Therefore, in the absorber 12, the treatment liquid can be separated into the first phase portion having a high acid compound content and the second phase portion having a low acid compound content with ease. On the other hand, in the regenerator 14, not only the first phase portion having the high acid compound content but also the second phase portion having the low acid compound content are mixed and introduced into the regenerator 14 so as to be heated. This enables reduction in energy for separating an acid compound from the treatment liquid.

Here, description will be made of a gas treatment method using the gas treatment device 10 according to the first embodiment. The gas treatment method includes an absorption step, a liquid feeding step, and a reproduction step.

The absorption step is a step of bringing a gas to be treated and a treatment liquid into contact with each other in the absorber 12. To the absorber 12, a gas to be treated which contains at least carbon dioxide is supplied, such as a process gas or the like, through the gas supply path 24. Also to the absorber 12, the treatment liquid (an absorbing solution) is introduced through the second flow path 22 of the circulation path 16. The absorbing solution flows down in the absorber 12 to come into contact with carbon dioxide contained in the gas to be treated and absorb the carbon dioxide. In the absorber 12, the treatment liquid absorbing carbon dioxide is stored. The treatment liquid contacting the carbon dioxide phase-separates into a first phase portion having a high carbon dioxide content and a second phase portion having a low carbon dioxide content.

The liquid feeding step is a step of feeding the treatment liquid stored in the absorber 12 from the absorber 12 to the regenerator 14. In this liquid feeding step, with the phase-separated first phase portion and second phase portion mixed, a total amount of the treatment liquid is introduced into the regenerator 14. In other words, the treatment liquid derived from the absorber 12 is mixed by the mixing portion 40 in the middle of flowing in the first flow path 21. The treatment liquid in this state is heated in the heat exchanger 18 by the treatment liquid flowing in the second flow path 22 and then introduced into the regenerator 14.

The reproduction step is a step of heating a treatment liquid introduced into the regenerator 14 to separate carbon dioxide from the treatment liquid. In the regenerator 14, the treatment liquid with the first phase portion and the second phase portion mixed is heated while flowing down. At this time, the treatment liquid is heated with the second phase portion having a low carbon dioxide content intervening. As a result, a temperature at which carbon dioxide is separated can be suppressed to be low. In the regenerator 14, when the treatment liquid is heated, water vapor evaporating from the treatment liquid may be obtained in some cases. Carbon dioxide and water vapor separated from the treatment liquid flow in the supply path 30. In the supply path 30, the water vapor is condensed in the condenser 34 and is returned to the regenerator 14. Accordingly, only the carbon dioxide separated from the treatment liquid is supplied to a supply destination. The treatment liquid stored in the regenerator 14 flows through the second flow path 22 to be refluxed to the absorber 12. In the middle thereof, in the heat exchanger 18, the treatment liquid heats a treatment liquid flowing through the first flow path 21 to lower the temperature thereof.

As described in the foregoing, in the first embodiment, in the absorption step, a gas to be treated which contains carbon dioxide comes into contact with a treatment liquid, so that the treatment liquid phase-separates into the first phase portion having a high carbon dioxide content and the second phase portion having a low carbon dioxide. The phase-separated treatment liquid is introduced into the regenerator 14 with the first phase portion and the second phase portion mixed. In other words, a treatment liquid with the first phase portion having a high carbon dioxide content mixed with the second phase portion having a low carbon dioxide content is introduced into the regenerator 14. Therefore, in the reproduction step, carbon dioxide is separated from the treatment liquid (the absorbing solution) with the second phase portion intervening. Accordingly, as compared with a method of introducing, into the regenerator, a treatment liquid having the second phase portion separated from the first phase portion, reproduction energy required for reproduction of a treatment liquid (i.e., release of carbon dioxide from the treatment liquid) can be further reduced.

In addition, since in the first embodiment, the mixing portion 40 is provided in the first flow path 21, the mixing portion 40 reliably attains a state where the first phase portion and the second phase portion are mixed. Accordingly, an effect of reducing energy required for reproduction of a treatment liquid can be stabilized.

Although in the first embodiment, the mixing portion 40 is provided in the first flow path 21, the mixing portion 40 can be omitted as long as the first phase portion and the second phase portion are mixed due to a piping configuration of the first flow path 21 or a shape of an inflow into the regenerator 14, or the like.

Second Embodiment

Figure 4:
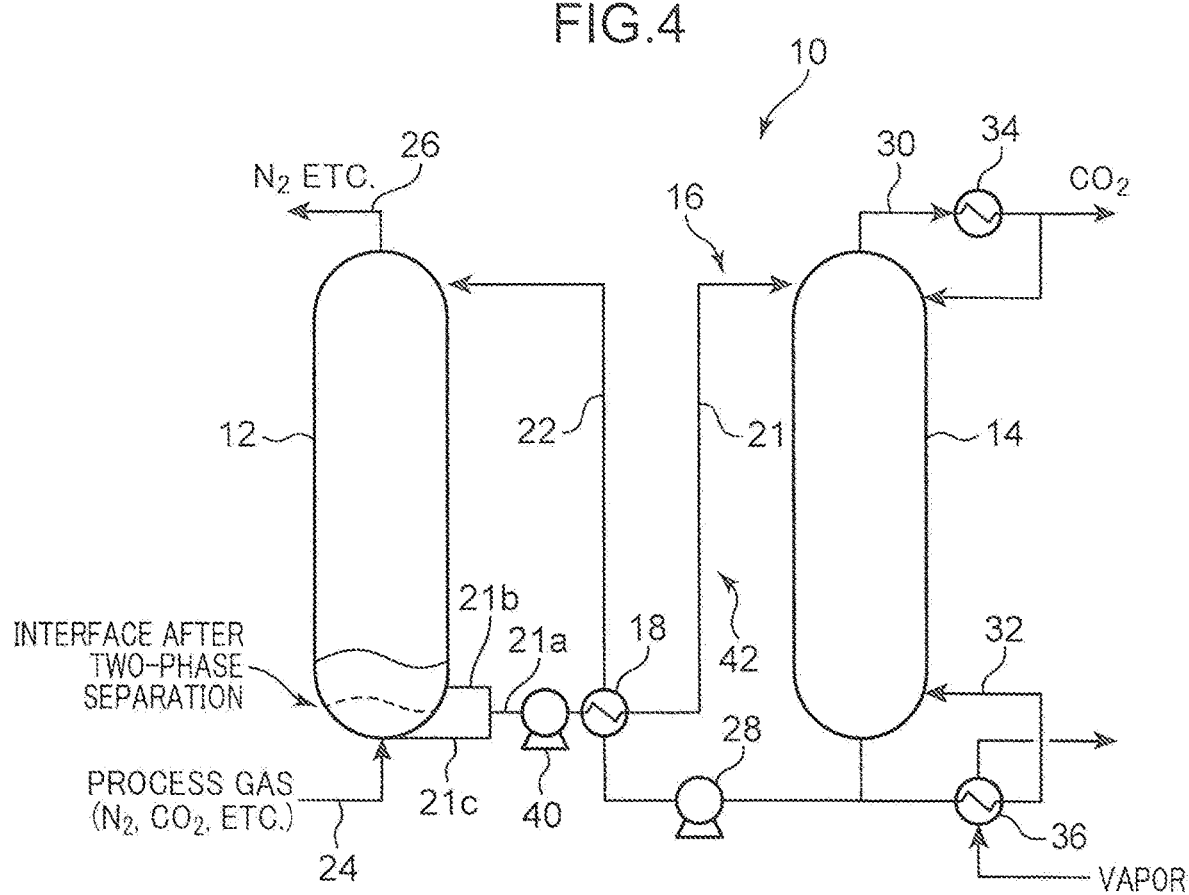
FIG. 4 is a diagram schematically showing an entire configuration of a gas treatment device according to a second embodiment.

FIG. 4 shows a second embodiment of the present invention. Here, the same reference signs are given to the same components as those of the first embodiment, to omit detailed description thereof.

In the second embodiment, in a liquid feeding step, a plurality of treatment liquids having different ratios of a first phase portion to a second phase portion are mixed. The first embodiment is configured such that a treatment liquid is extracted from one position in the up-down direction of the absorber 12. In other words, the end portion of the first flow path 21 is connected to the absorber 12 without branching. By contrast, in the second embodiment, an inflow end of the first flow path 21 is branched into two branch flow paths 21b and 21c, the respective branch flow paths 21b and 21c being connected to an absorber 12 at positions apart from each other in an up-down direction. Then, at a position where the branch flow paths 21b and 21c merge, a pump as a mixing portion 40 is arranged. Accordingly, a treatment liquid in the absorber 12 flows out of the absorber 12 from each of two positions of the absorber 12 in the up-down direction and merge with each other in the first flow path 21. In this case, the first flow path 21 is to include a main flow path 21a having one end portion connected to a regenerator 14 and the two branch flow paths 21b and 21c connected to the other end portion of the main flow path 21a.

The treatment liquid stored in the absorber 12 has a different ratio of the first phase portion to the second phase portion according to a position in the up-down direction. For example, a lower part has a higher ratio of the first phase portion. Alternatively, the second phase portion is present above the first phase portion, with an interface present therebetween. Therefore, a ratio of the first phase portion to the second phase portion in a treatment liquid to be introduced into the regenerator 14 is determined by a flow ratio of a treatment liquid extracted from a low position of the absorber 12 to a treatment liquid extracted from a position higher than the same, and by the positions of the absorber 12 in up-down direction where each of the treatment liquids is extracted. Accordingly, by merging these treatment liquids, a constituent ratio of the first phase portion to the second phase portion contained in the treatment liquid is allowed to fall within an appropriate range.

Accordingly, in the second embodiment, in a treatment liquid to be introduced into the regenerator 14, the first phase portion and the second phase portion can be contained at a ratio within a fixed range. In other words, by appropriately setting a position of connection between the branch flow paths 21b and 21c in the absorber 12, a ratio of the first phase portion to the second phase portion can be adjusted to be within an appropriate range. Accordingly, an effect of reducing energy required for reproduction of a treatment liquid can be stabilized. Required configuration, not limited to a configuration in which a treatment liquid is extracted from two positions in the up-down direction, may be a configuration in which the treatment liquid is extracted from three or more positions and merged.

Figure 5:
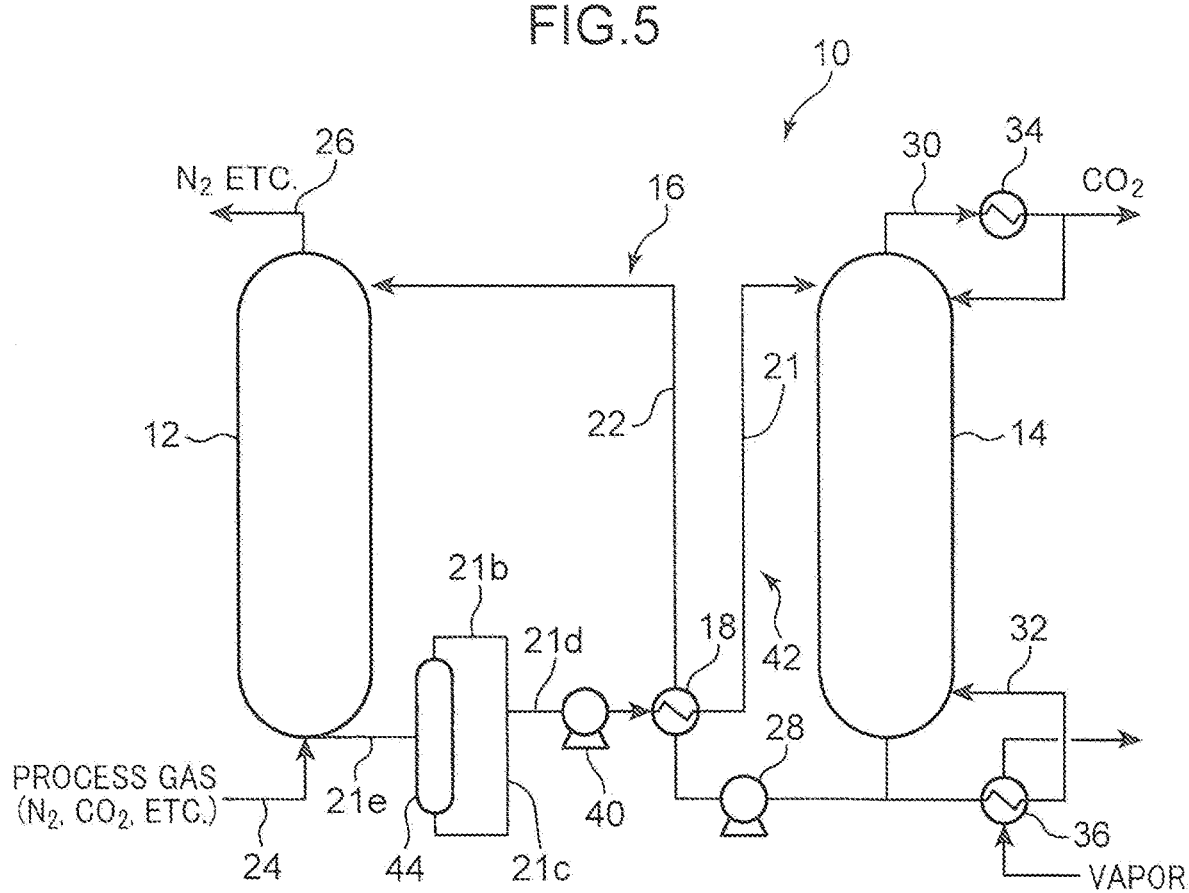
FIG. 5 is a diagram schematically showing an entire configuration of a gas treatment device according to a modification of the second embodiment.

As shown in FIG. 5, a liquid separator 44 may be arranged in the first flow path 21 and the two branch flow paths 21b and 21c may be connected to the liquid separator 44. In this case, the first flow path 21 is to include a first main flow path 21d having one end portion connected to the regenerator 14, the two branch flow paths 21b and 21c which connect the other end portion of the first main flow path 21d and the liquid separator 44, and a second main flow path 21e which connects the liquid separator 44 and the absorber 12. Then, the mixing portion 40 is provided in the first main flow path 21d. The branch flow paths 21b and 21c are both connected at positions of the liquid separator 44 apart from each other in the up-down direction. Additionally, a treatment liquid in the liquid separator 44, similarly to a treatment liquid in the absorber 12, has a different ratio of the first phase portion to the second phase portion according to a position in the up-down direction, or has the second phase portion present above the first phase portion, with an interface present therebetween.

Therefore, the treatment liquid flowing through one branch flow path 21b and the treatment liquid flowing through the other branch flow path 21c have different constituent ratios of the first phase portion to the second phase portion. Accordingly, also in this case, similarly to the mode shown in FIG. 4, a ratio of the first phase portion to the second phase portion can be adjusted to be within an appropriate range, thereby stabilizing an effect of reducing energy required for reproduction of a treatment liquid.

In the configurations shown in FIG. 4 and FIG. 5, the mixing portions 40 can be omitted.

Third Embodiment

Figure 6:
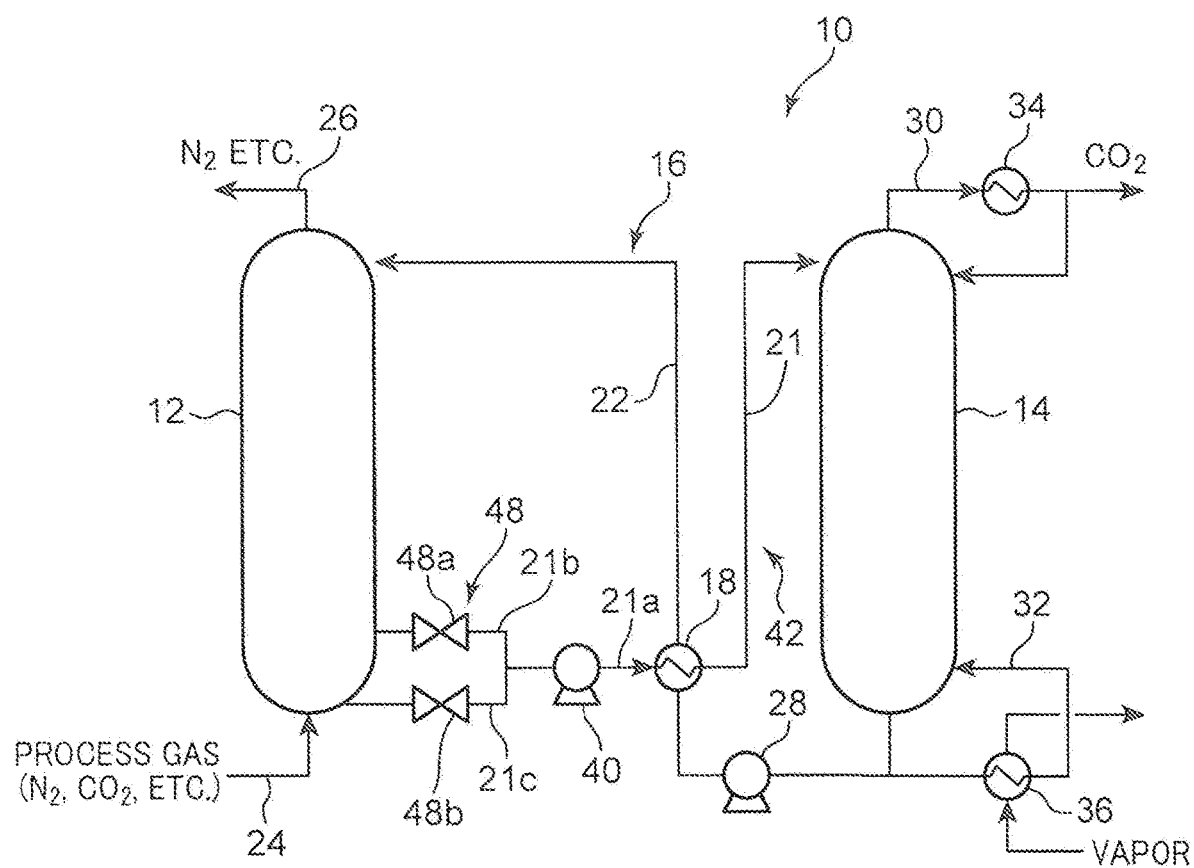
FIG. 6 is a diagram schematically showing an entire configuration of a gas treatment device according to a third embodiment.

FIG. 6 shows a third embodiment of the present invention. Here, the same reference signs are given to the same components as those of the first embodiment, to omit detailed description thereof.

In this third embodiment, there is provided an adjustment portion 48 which adjusts a mixing ratio of a plurality of treatment liquids having ratios of the first phase portion to the second phase portion different from each other at the time of the mixture thereof. Similarly to the second embodiment, also in the third embodiment, a first flow path 21 includes a main flow path 21a having one end portion connected to a regenerator 14, and two branch flow paths 21b and 21c connected to the other end portion of the main flow path 21a. The adjustment portion 48 includes adjustment valves 48a and 48b provided in the respective branch flow paths 21b and 21c and having adjustable opening. Adjusting opening of each of the adjustment valves 48a and 48b enables adjustment of a mixing ratio of a treatment liquid from each outflow position. Accordingly, the third embodiment enables a ratio of the first phase portion to the second phase portion to be appropriately adjusted according to conditions. The adjustment valves 48a and 48b may be controlled by a controller not shown or have opening manually adjusted.

Figure 7:
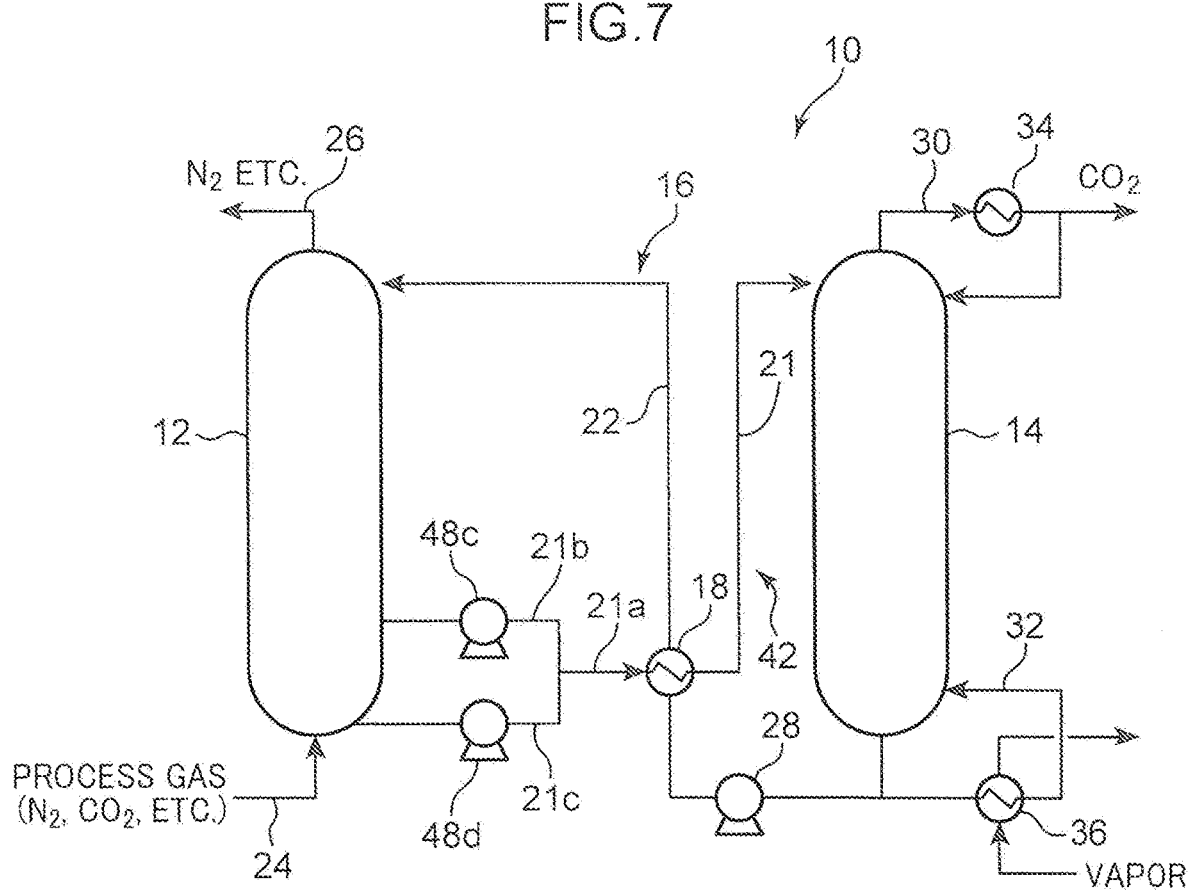
FIG. 7 is a diagram schematically showing an entire configuration of a gas treatment device according to a modification of the third embodiment.

As shown in FIG. 7, the adjustment portion 48 may be configured with pumps 48c and 48d provided in the branch flow paths 21b and 21c. In this case, by adjusting the rotation numbers of each of the pumps 48c and 48d manually or by a controller not shown enables adjustment of a mixing ratio of a treatment liquid flowing through each of the branch flow paths 21b and 21c. In this case, the pump of the main flow path 21a can be omitted.

Figure 8:
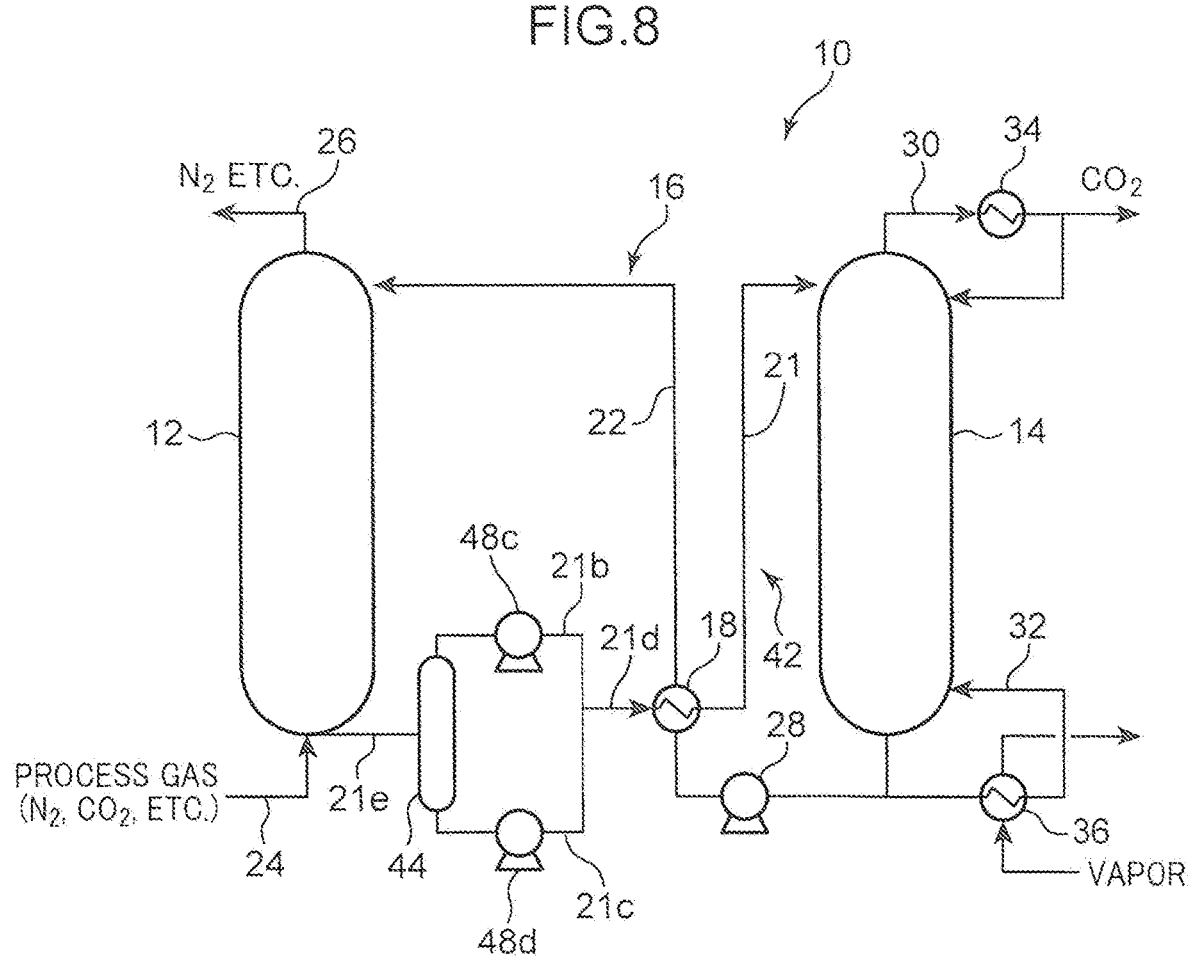
FIG. 8 is a diagram schematically showing an entire configuration of a gas treatment device according to a modification of the third embodiment.

Additionally, as shown in FIG. 8, even when the liquid separator 44 is provided, the branch flow paths 21b and 21c can be provided with the pumps 48c and 48d, respectively, as the adjustment portion 48.

The other configurations, functions, and effects, which will not be described, are the same as those of the first and second embodiments.

Fourth Embodiment

Figure 9:
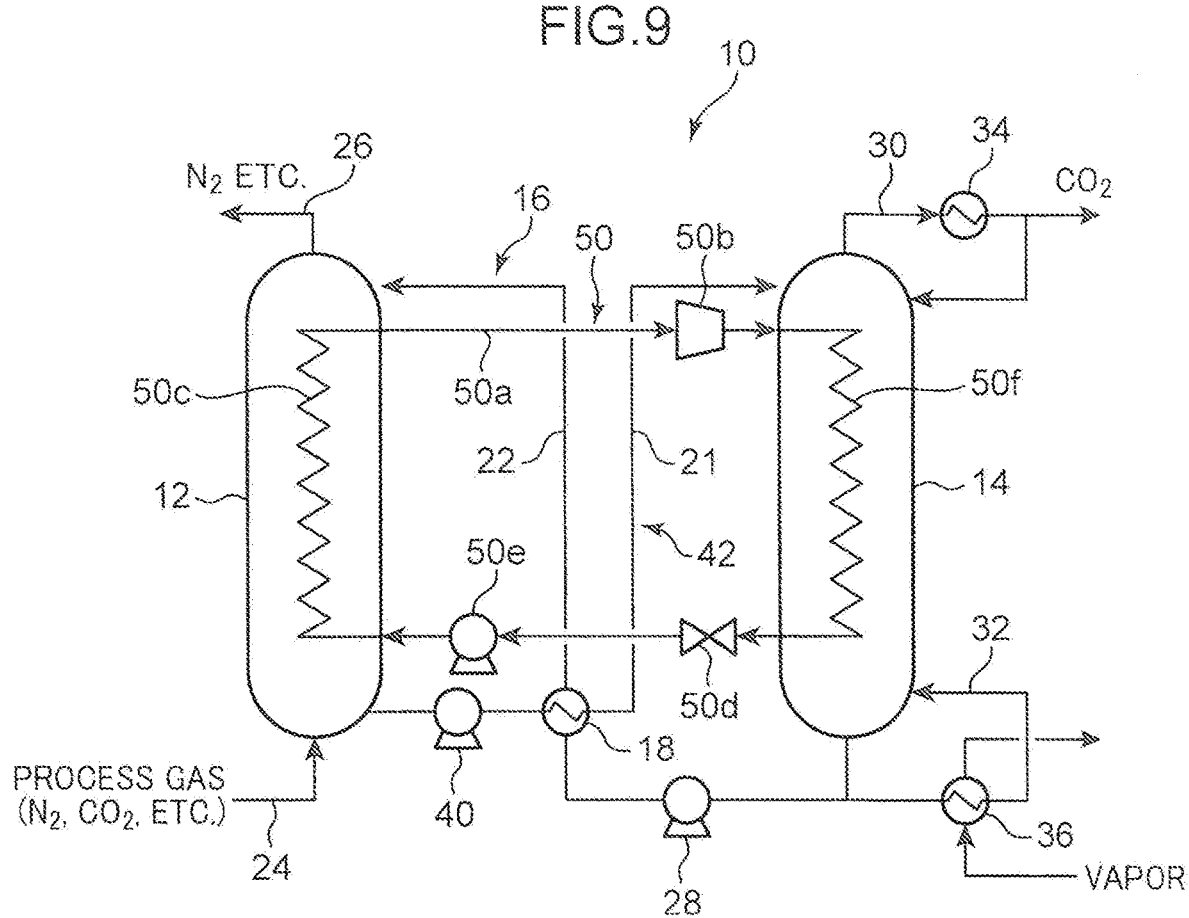
FIG. 9 is a diagram schematically showing an entire configuration of a gas treatment device according to a fourth embodiment.
Figure 10:
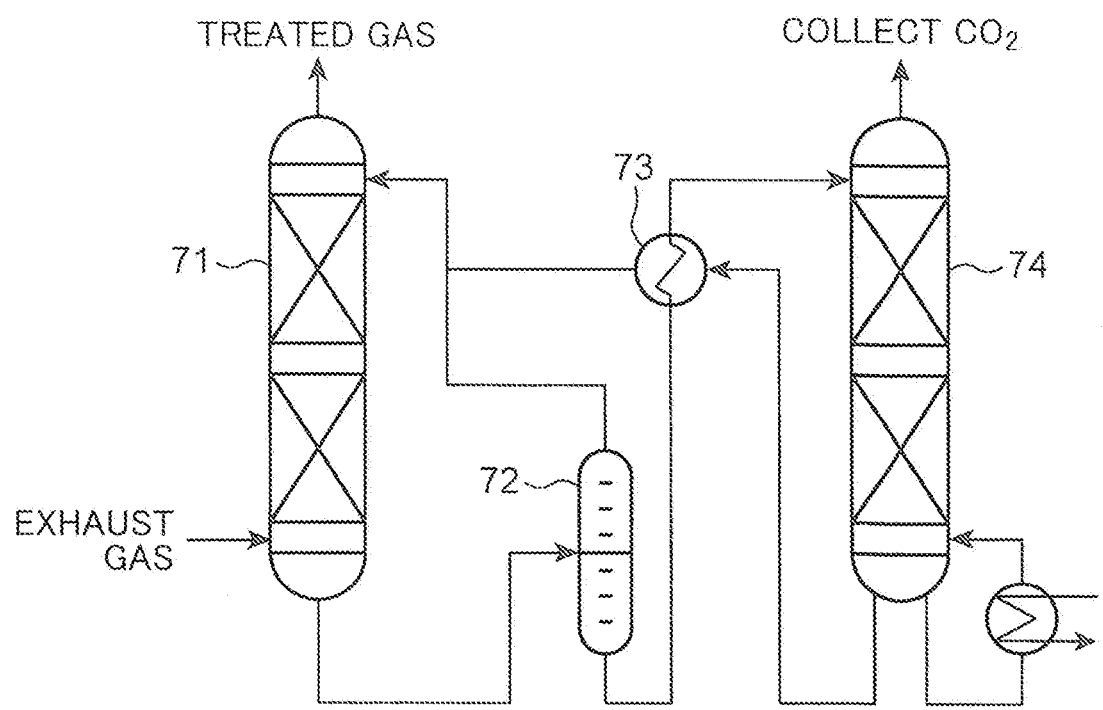
FIG. 10 is a diagram schematically showing an entire configuration of a conventional gas treatment device.
Figure 11:
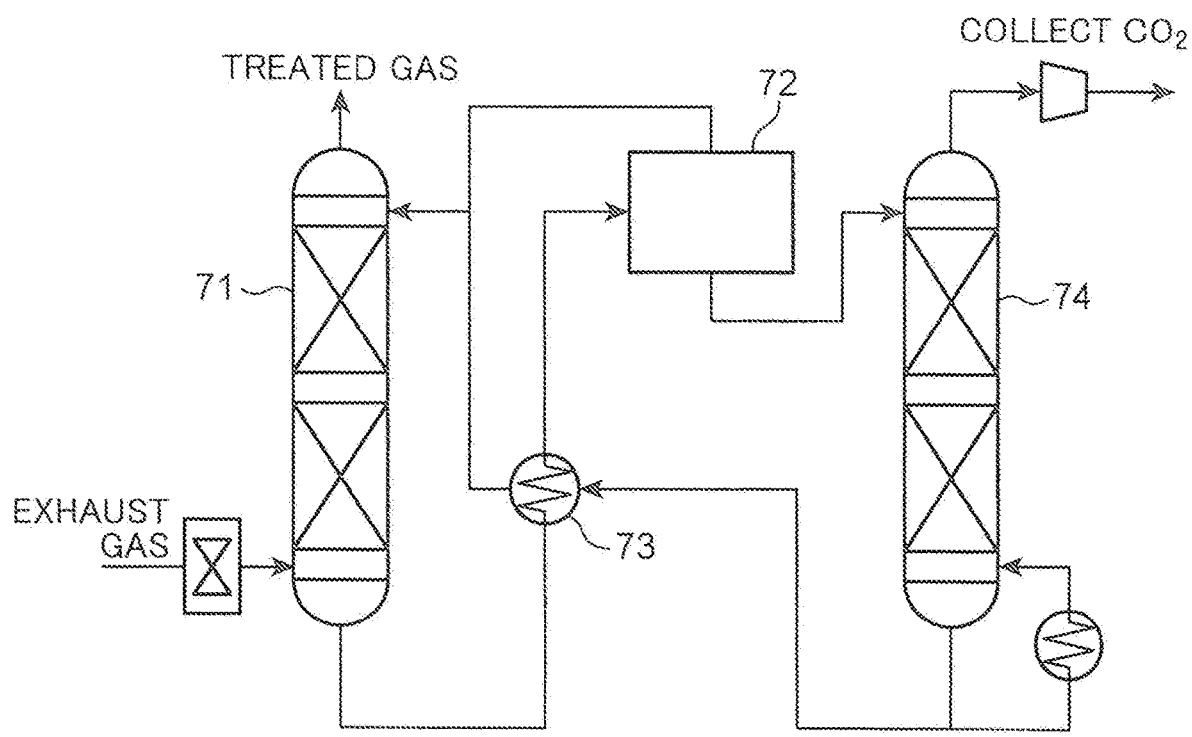
FIG. 11 is a diagram schematically showing an entire configuration of a conventional gas treatment device.

FIG. 9 shows a fourth embodiment of the present invention. Here, the same reference signs are given to the same components as those of the first embodiment, to omit detailed description thereof.

A gas treatment device 10 according to the fourth embodiment includes a heat transport portion (heat pump) 50 which transports heat of reaction in an absorber 12 to a regenerator 14. The heat transport portion 50 includes a closed-loop-shaped circulation flow path 50a in which a coolant is encapsulated, and a compressor 50b, an evaporator 50c, an expansion mechanism 50d, a pump 50e, and a condenser 50f all connected to the circulation flow path 50a. The evaporator 50c is configured, for example, with a heat transfer pipe and is arranged in the absorber 12. In the absorber 12, exothermic reaction occurs in which a treatment liquid absorbs carbon dioxide. The liquid-state coolant flowing in the evaporator 50c is heated by this heat and evaporated. The gas-state coolant is compressed by the compressor 50b to flow into the condenser 50f. The condenser 50f is configured, for example, with a heat transfer pipe and is arranged in the regenerator 14. In the regenerator 14, heat endothermic reaction occurs in which carbon dioxide is released from a treatment liquid. The gas-state coolant flowing in the condenser 50f is condensed by the heat endothermic reaction. The condensed liquid-state coolant is expanded by the expansion mechanism 50d and fed by the pump 50e to flow into the evaporator 50c. Thus, circulation of the coolant causes the heat of reaction in the absorber 12 to be transported to the regenerator 14.

Here, consideration will be given to a condition for achieving energy saving by the heat transport portion 50. With a condensation temperature represented as TH and an evaporation temperature as TC, efficiency of a Carnot's cycle (Carnot efficiency) $\eta_c$ can be expressed as follows:

$$\eta_c = TC/(TH-TC)+1.$$

Then, with heat insulating efficiency represented as $\eta_{ad}$, power generation efficiency as $\eta_e$, and performance of the heat pump as $COP_{abs.th}$, because the performance of the heat pump is expressed as Carnot efficiency÷heat insulating efficiency÷power generation efficiency, the following expression holds.

$COP_{abs.th} = \eta_c/\eta_{ad}/\eta_e = (TC/(TH-TC)+1)/\eta_{ad}/\eta_e$. Additionally, performance as the heat pump requires operation such that $\eta_e \cdot COP_{abs.th}$ is 1 or more on a primary energy basis. Accordingly, the heat transport portion 50 should be operated such that $COP_{abs.th}/(1/\eta_e)$ is 1 or more.

In a conventional method, where the heat transport portion is operated, for example, with the absorber 12 having an internal temperature of 40° C. and the regenerator 14 having an internal temperature of 120° C., when a temperature difference between a temperature of a treatment liquid and a temperature of a coolant (evaporation temperature and condensation temperature) is assumed to be 10° C., the heat transport portion is to be operated at TC=303K (30° C.) and TH=403K (130° C.). In a case where MEA is used as an amine compound, a heat of reaction will be 1.9 GJ/t-$CO_2$ and an evaporation latent heat will be 2.1 GJ/t-$CO_2$. In a case where with Carnot efficiency $\eta_c=303/(403-303)+1=4.03$ and heat insulating efficiency $\eta_{ad}=0.7$, when MEA is used, $COP_{MEA}=4.03\times0.7=2.8$ is established and when power generation efficiency is also taken into consideration, with power generation efficiency $\eta_e$ of 0.4, $COP_{MEA, th}=4.03\times 0.7\times 0.4=1.13$ is established. Accordingly, a unit of energy when the heat transport portion 50 is used will be expressed as $1.9/1.13+2.1=3.8$ GJ/t-$CO_2$.

Here, a temperature difference for an operation condition under which COP exceeds 2.7 will be calculated. With Carnot efficiency=2.7/0.7=3.86 and a temperature on the absorption side fixed, it is only necessary to calculate a temperature difference $\Delta T$ such that the Carnot efficiency $\eta_c$ of 3.86 is not less than 303/($\Delta T$). This calculation finds that $\Delta T$ of 78.4° C. or lower enables energy saving. For example, at an absorption temperature of 40° C., when a reproduction temperature is 98.4° C. or lower, more energy saving can be achieved as compared to conventional vapor heating.

In the fourth embodiment, use of the heat transport portion 50 produces an energy saving effect. Accordingly, reproduction energy required for reproducing a treatment liquid can be reduced.

The other configurations, functions, and effects, which will not be described, are the same as those of the first and second embodiments.

Here, the embodiment will be summarized (1) The gas treatment method according to the embodiment includes an absorption step of bringing into contact with each other in an absorber, a gas to be treated which contains an acid compound that dissolves into water to produce acid and a treatment liquid which absorbs the acid compound to phase-separate, to cause the acid compound contained in the gas to be treated to be absorbed in the treatment liquid; a liquid feeding step of feeding the treatment liquid, in which the acid compound contained in the gas to be treated is absorbed, from the absorber to a regenerator; and a reproduction step of heating the treatment liquid in the regenerator to separate an acid compound from the treatment liquid. In the absorption step, the treatment liquid contacting the acid compound in the gas to be treated phase-separates into a first phase portion having a high acid compound content and a second phase portion having a low acid compound content, and in the liquid feeding step, the treatment liquid having the phase-separated first phase portion and second phase portion mixed is introduced into the regenerator.

In the gas treatment method, in the absorption step, as a result of contact of a gas to be treated which contains an acid compound with a treatment liquid, the treatment liquid phase-separates into the first phase portion having a high acid compound content and the second phase portion having a low acid compound content. With the first phase portion and the second phase portion mixed, the phase-separated treatment liquid is introduced into the regenerator. Specifically, a treatment liquid with the second phase portion having a low acid compound content mixed with the first phase portion having a high acid compound content is introduced into the regenerator. Therefore, in the reproduction step, an acid compound is separated through the second phase portion. Accordingly, as compared with a method of introducing a treatment liquid having a second phase portion separated from a first phase portion into a regenerator, reproduction energy required for reproduction of a treatment liquid (i.e., release of an acid compound from the treatment liquid) can be further reduced.

(2) In the liquid feeding step, the first phase portion and the second phase portion may be mixed by a mixing portion. In this mode, the mixing portion enables a state where the first phase portion and the second phase portion are mixed to be reliably obtained. Accordingly, an effect of reducing energy required for reproduction of a treatment liquid can be stabilized.

(3) In the liquid feeding step, the treatment liquid flowing out from each of a plurality of positions in an up-down direction of the absorber may be mixed to each other to be introduced into the regenerator. In the absorber, ratios of the first phase portion to the second phase portion are different at different positions in the up-down direction. Accordingly, as a result of introduction, into the regenerator, of the treatment liquid flowing out from each of the plurality of positions in the up-down direction of the absorber, the treatment liquid to be introduced into the regenerator is allowed to contain the first phase portion and the second phase portion at a fixed ratio. Accordingly, the effect of reducing energy required for reproduction of a treatment liquid can be stabilized.

(4) In the liquid feeding step, the treatment liquid flowing out from the absorber may be stored in a liquid separator and a treatment liquid flowing out from each of a plurality of positions in an up-down direction of the liquid separator may be introduced into the regenerator. In the liquid separator, ratios of the first phase portion to the second phase portion are different at different positions in the up-down direction. Accordingly, as a result of introduction, into the regenerator, of the treatment liquid flowing out from each of the plurality of positions in the up-down direction of the liquid separator, the treatment liquid to be introduced into the regenerator is allowed to contain the first phase portion and the second phase portion at a fixed ratio. Accordingly, the effect of reducing energy required for reproduction of a treatment liquid can be stabilized.

(5) In the liquid feeding step, a mixing ratio of a treatment liquid from each outflow position may be adjusted. Since in this mode, a ratio of the first phase portion to the second phase portion contained in the treatment liquid to be introduced into the regenerator can be adjusted, a ratio of the first phase portion to the second phase portion can be appropriately adjusted according to conditions.

(6) A heat transport portion which transports heat of reaction of the absorber to the regenerator may be used. In this case, the heat transport portion may be operated such that with performance of the heat transport portion represented as $COP_{abs.th}$ and power generation efficiency as $\eta_e$, $COP_{abs.th}/(1/\eta_e)$ is 1 or more.

In this mode, use of the heat transport portion produces an energy saving effect. Accordingly, reproduction energy required for reproducing a treatment liquid can be further reduced.

(7) The gas treatment device according to the embodiment uses a gas to be treated which contains an acid compound that dissolves into water to produce acid and a treatment liquid which absorbs the acid compound to phase-separate, to separate an acid compound from the gas to be treated, and the gas treatment device includes: an absorber which brings the gas to be treated into contact with the treatment liquid; a regenerator which heats the treatment liquid contacting the gas to be treated to separate an acid compound; and a liquid feeding portion which feeds the treatment liquid contacting the gas to be treated in the absorber to the regenerator. In the absorber, the treatment liquid contacting the gas to be treated phase-separates into a first phase portion having a high acid compound content and a second phase portion having a low acid compound content. The liquid feeding portion is configured to introduce, into the regenerator, the treatment liquid with the phase-separated first phase portion and second phase portion mixed.

In the gas treatment device, in the absorber, a treatment liquid contacting a gas to be treated which contains an acid compound phase-separates into a first phase portion having a high acid compound content and a second phase portion having a low acid compound content. With the first phase portion and the second phase portion mixed, the phase-separated treatment liquid is introduced into the regenerator by the liquid feeding portion. Specifically, a treatment liquid with the second phase portion having a low acid compound content mixed with the first phase portion having a high acid compound content is introduced into the regenerator. Therefore, in the reproduction step, an acid compound is separated with the second phase portion intervening. Accordingly, as compared with a configuration of introducing, into the regenerator, a treatment liquid having a second phase portion separated from a first phase portion, reproduction energy required for reproduction of a treatment liquid (i.e., release of an acid compound from the treatment liquid) can be further reduced.

(8) The liquid feeding portion may have a mixing portion which mixes the phase-separated first phase portion and second phase portion.

(9) The liquid feeding portion may be configured to mix the treatment liquid flowing out from each of a plurality of positions in an up-down direction of the absorber so as to be introduced into the regenerator.

(10) The liquid feeding portion may include a liquid separator which stores the treatment liquid flowing out from the absorber. In this case, the liquid feeding portion may be configured to introduce, into the regenerator, a treatment liquid flowing out from each of a plurality of positions in an up-down direction of the liquid separator.

(11) The liquid feeding portion may include an adjustment portion which adjusts a mixing ratio of a treatment liquid from each outflow position.

As described in the foregoing, the embodiment enables more reduction in energy necessary for separately collecting an acid compound in a method of using a treatment liquid that phase-separates into a first phase portion having a high acid compound content and a second phase portion having a low acid compound content to separate an acid compound, and a device therefor.

This application is based on Japanese Patent application No. 2017-091045 filed in Japan Patent Office on May 1, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A gas treatment method comprising:
    an absorption step of bringing into contact with each other in an absorber, a gas to be treated which contains an acid compound that dissolves into water to produce acid and a treatment liquid which absorbs the acid compound to phase-separate, to cause the acid compound contained in the gas to be treated to be absorbed in the treatment liquid;
    a liquid feeding step of feeding the treatment liquid, in which the acid compound contained in the gas to be treated is absorbed, from the absorber to a regenerator; and
    a reproduction step of heating the treatment liquid in the regenerator to separate an acid compound from the treatment liquid,
    wherein in the absorption step, the treatment liquid contacting the acid compound in the gas to be treated phase-separates into a first phase portion having a high acid compound content and a second phase portion having a low acid compound content, and
    in the liquid feeding step, the treatment liquid having the phase-separated first phase portion and second phase portion mixed is introduced into the regenerator.

2. The gas treatment method according to claim 1, wherein
    a heat transport portion which transports heat of reaction of the absorber to the regenerator is used, the heat transport portion being operated such that, with performance of the heat transport portion represented as $COP_{abs.th}$ and power generation efficiency as $\eta_e$, $COP_{abs.th}/(1/\eta_e)$ is 1 or more.

3. The gas treatment method according to claim 1, wherein
    in the liquid feeding step, the first phase portion and the second phase portion are mixed by a mixing portion.

4. The gas treatment method according to claim 1, wherein in the liquid feeding step, the treatment liquid flowing out from each of a plurality of positions in an up-down direction of the absorber is mixed to each other to be introduced into the regenerator.

5. The gas treatment method according to claim 4, wherein in the liquid feeding step, a mixing ratio of a treatment liquid from each outflow position is adjusted.

6. The gas treatment method according to claim 1, wherein in the liquid feeding step, the treatment liquid flowing out from the absorber is stored in a liquid separator and a treatment liquid flowing out from each of a plurality of positions in an up-down direction of the liquid separator is introduced into the regenerator.

7. The gas treatment method according to claim 6, wherein in the liquid feeding step, a mixing ratio of a treatment liquid from each outflow position is adjusted.

* * * * *